United States Patent [19]

Shoji et al.

[11] Patent Number: 4,604,006
[45] Date of Patent: Aug. 5, 1986

[54] DRILLING MACHINE HAVING ELECTROMAGNETIC BASE

[75] Inventors: Mitihiro Shoji; Toshio Mikiya, both of Tokyo, Japan

[73] Assignee: Nitto Kohki Co., Ltd., Tokyo, Japan

[21] Appl. No.: 796,530

[22] Filed: Nov. 12, 1985

Related U.S. Application Data

[63] Continuation of Ser. No. 401,984, Jul. 26, 1982, abandoned.

[30] Foreign Application Priority Data

Nov. 20, 1981 [JP] Japan .................... 56-186473
Feb. 17, 1982 [JP] Japan .................... 57-23741

[51] Int. Cl.⁴ ............................................. B23B 47/24
[52] U.S. Cl. ........................................ 408/76; 408/6; 408/9; 408/11; 408/15
[58] Field of Search ............... 408/5, 6, 8, 9, 10, 408/11, 14, 15, 16, 76

[56] References Cited

U.S. PATENT DOCUMENTS

| | | | |
|---|---|---|---|
| 2,356,438 | 8/1944 | Wilson | 408/16 |
| 3,259,023 | 7/1966 | Rieger et al. | 408/9 |
| 3,371,257 | 2/1968 | Warren et al. | 408/76 |
| 3,516,327 | 6/1970 | Wilson | 408/14 |
| 3,545,310 | 12/1970 | Porath et al. | 408/11 |
| 3,720,135 | 3/1973 | Merner et al. | 408/6 |
| 3,969,036 | 7/1976 | Hougen | 408/76 |
| 4,025,218 | 5/1977 | Logan et al. | 408/11 |
| 4,260,305 | 4/1981 | Clopton | 408/6 |
| 4,261,673 | 4/1981 | Hougen | 408/5 |
| 4,317,176 | 2/1982 | Saar et al. | 318/334 |

FOREIGN PATENT DOCUMENTS

| | | | |
|---|---|---|---|
| 7432202 | 9/1974 | France | 408/10 |
| 31542 | 3/1980 | Japan | 408/6 |

*Primary Examiner*—Gil Weidenfeld
*Assistant Examiner*—Daniel W. Howell
*Attorney, Agent, or Firm*—Wenderoth, Lind & Ponack

[57] ABSTRACT

A drilling machine provided with an electromagnetic base comprises a first control system by which a warning device is actuated and/or a feed motor for automatically advancing an electric drill toward a workpiece is stopped when a load on the electric drill exceeds a prescribed first reference level while at work. A second control system further provided on the drilling machine is adapted to have the feed motor and/or the electric drill stopped when the load thereon is further increased and reaches a second reference level higher than the first reference level to assure high safety.

1 Claim, 9 Drawing Figures

DRILLING MACHINE HAVING ELECTROMAGNETIC BASE

This application is a continuation of now abandoned Ser. No. 401,984 filed July 26, 1982 now abandoned.

BACKGROUND OF THE INVENTION

1. Field of the Invention

This invention relates to a drilling machine provided with an electromagnetic base, which possesses a function of self-operated control fulfilled by sequentially detecting a load exerted on a driving motor for an electric drill. More particularly, this invention relates to a drilling machine provided with an electromagnetic base, which is adapted to bore a hole in a workpiece by utilizing an annular cutter and serves to issue warnings and/or to operate a control system for the electric drill when an overload is brought about on the driving motor of the electric drill while the machine is in operation.

2. Description of the Prior Art

There has been hitherto proposed and actually used a drilling machine comprising an electromagnetic base capable of electromagnetical fixation on a workpiece and an electric drill integrally mounted on the electromagnetic base. The driling machine of this type excels in workability, whereas the electromagnetic base will readily fail to be fixed stably on the workpiece even when a slightly large load is brought about on the electric drill. Particularly, in a case where an annular cutter requiring larger torque compared with a twist drill is used for this drilling machine, the machine is susceptible to accidents such as side slipping of the machine on the workpiece, breakage of the annular cutter and seizure of the driving motor. To remedy such disadvantages of the use of the annular cutter, there has been proposed a drilling machine comprising a punching assembly disposed behind the elctromagnetic base and serving as a means for securely fixing the machine on a workpiece and a control switch which is actuated upon detection of abnormal motion of the electromagnetic base thereby bringing the driving motor to a stop. (U.S. Pat. Nos. 3,969,036 and 4,261,673) Such a drilling machine has, however, entailed a disadvantage that the control switch for the driving motor is actuated when an accident has already been brought about, and therefore, it fails to serve as a measure for completely preventing these accidents as described above.

SUMMARY OF THE INVENTION

One object of this invention is to provide a drilling machine with an electromagnetic base, which is capable of automatically or manually issuing warnings and bringing an electric drill and/or a feed motor for advancing the electric drill toward a workpiece to a stop when the electric drill is overloaded while at work.

Another object of this invention is to provide a drilling machine with an electromagnetic base capable of realizing automation of boring operations and fulfilling boring work with improved efficiency.

To accomplish the objects described above in accordance with this invention, there is provided a drilling machine with an electromagnetic base, which comprises a control system composed of at least one comparator for comparing a load value detected from an electric drill with a prescribed reference level and at least one controller by which, when an overload is brought about on the electric drill, a warning device is actuated to give a warning and/or a feed motor for advancing the electric drill toward a workpiece and/or a driving motor of the electric drill are brought to a stop.

The control system is usually possessed of a first comparator prescribing a first reference level and a second comparator prescribing a second reference level higher than the first reference level of the first comparator. When the load exerted on the driving motor of the electric drill reaches the first reference level while at work, the warning device such as a warning lamp is turned on to issue a warning. When the load exerted on the driving motor is further increased and reaches the second reference level, the controller is operated to open a power circuit for driving the driving motor thereby bringing the driving motor to a stop. To realize automation of drilling work, the feed motor for advancing the electric drill toward the workpiece is disposed on the drilling machine, so that the feed motor is caused to be stopped at the same time the warning is issued, when the load in excess of the first reference level is detected. In a case where the feed motor is utilized to attain the automation of the machine, a limit switch which is actuated when the electric drill is moved to its lowest position is provided on the drilling machine, so that the feed motor is automatically stopped by causing the limit switch to be opened when the drilling tool pierces the workpiece to make a hole and the boring work is finished. An indicating lamp for the finish of the boring work, which is lighted when the limit switch is actuated to be closed may be provided. Thus, when the load exerted on the electric drill exceeds the first reference level, the warning device is actuated and simultaneously, the feed motor comes automatically to a stop, whereas the driving motor of the electric drill continues to be driven, with the result that the overload exerted on the electric drill is reduced, thereby allowing the feed motor to resume being driven when the load becomes lower than the prescribed first reference level.

As described above, the drilling machine according to this invention has an advantage that it can be prevented from bringing about the aforementioned accidents due to overload exerted on the electric drill, permits fullautomation of boring work to be accomplished with notably high operational efficiency, and enjoys high workability and safety.

The other objects and characteristics of the present invention will become apparent from the further disclosure of the invention to be made hereinafter with reference to the accompanying drawings.

DESCRIPTION OF THE PREFERRED EMBODIMENTS

This invention relates to a drilling machine provided with an electromagnetic base, which possesses a warning mechanism and/or a control system which are actuated when the electric drill thereof is overloaded.

Figure 1:
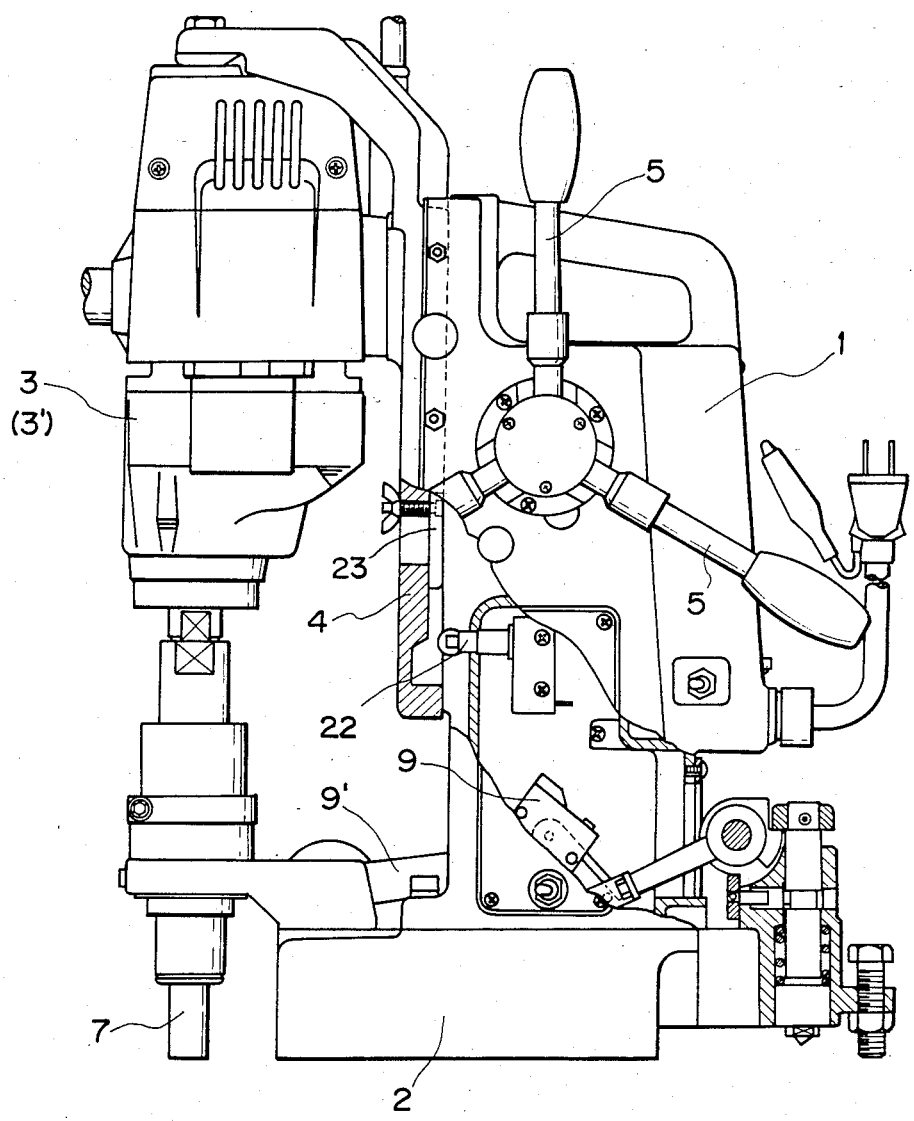
FIG. 1 is a side view, partly in section, of one embodiment of the drilling machine according to this invention.

As shown in FIG. 1, the drilling machine according to this invention is composed of a frame 1, an electromagnetic base 2 integrally mounted at the lower portion of the frame 1 and adapted to securely fix the drilling machine proper on a metallic workpiece, an electric drill 3 for boring a hole in the workpiece, and a guide plate 4 which is integrally attached to the electric drill 3 and slidably mounted on the front portion of the frame 1. The electric drill 3 and the guide plate 4 together can be moved up and down by hand by operating a control handle 5 which is put into engagement with the guide plate 4 through the medium of a transmission means such as a combination of a rack, a pinion and a clutch (not illustrated). The electric drill 3 incorporates a driving motor 3' provided with a drilling tool 7 such as an annular cutter.

Figure 3:
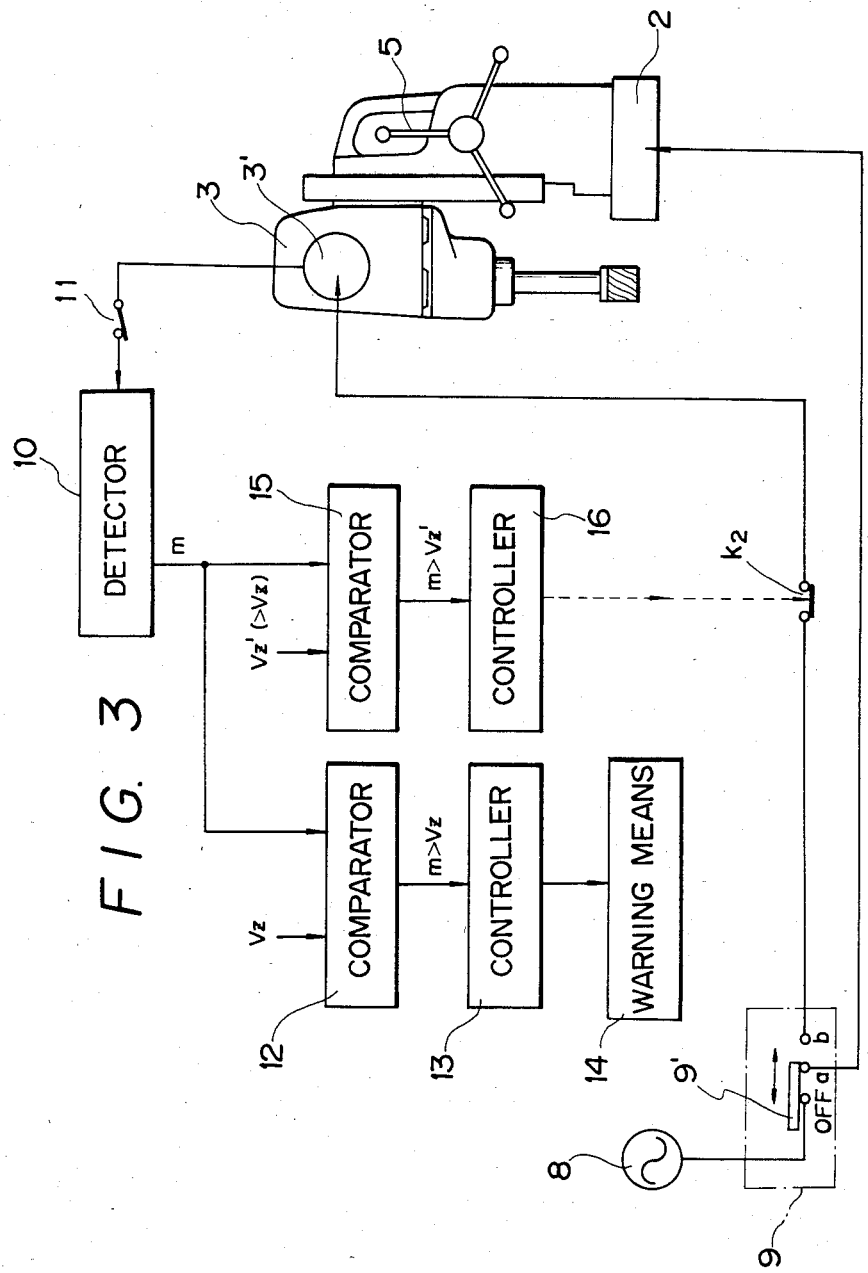
FIG. 3 is a schematic block diagram of one embodiment of the control system in the drilling machine according to this invention.

As shown in FIG. 3, by applying an electric current from a power source 8 through a power switch 9 to the electromagnetic base 2, the elecromatic base 2 is excited to be securely fixed on the workpiece and the driving motor 3' is actuated. The power switch 9 is of a three-mode selection switch capable of selecting one from among the off position, the position "a" for exciting the electromagnetic base 2 and the position "b" for actuating both the electromagnetic base 2 and the driving motor 3' by use of an operation lever 9'.

The drilling machine having the construction described above is provided with a control system which serves to issue a warning when the driving motor 3' is overloaded, and further to issue a warning and at the same time, to have the driving motor 3' of the electric drill 3 stopped when an excessive overload is brought about, thereby assuring safety. This control system is, as illustrated in a schematic block diagram of FIG. 3, composed of detector 10 for detecting a load exerted on the driving motor 3' of the electric drill 3 through a changeover switch 11 which is capable of selecting non-control operations and outputting a load value m, a comparator 12 for comparing the load value m fed from the detector 10 with a prescribed first reference voltage level Vz and issuing an instruction signal when the load value m exceeds the first reference level Vz, and a controller 13 for actuating a warning means 14 upon reception of the instruction signal issued from the comparator 12, whereby the warning means such as a warning lamp or buzzer is actuated to issue an warning when the load exerted on the electric drill 3 while at work exceeds that corresponding to the prescribed first reference level Vz.

Figure 2:
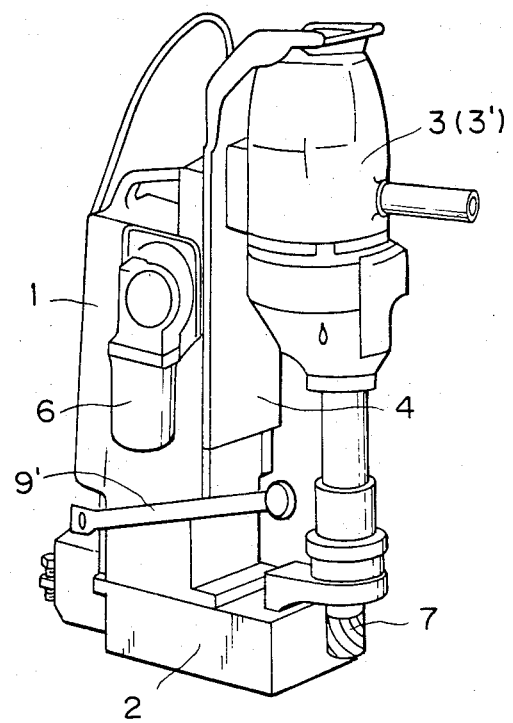
FIG. 2 is a perspective view of the same embodiment of the drilling machine according to this invention.

In this embodiment according to the invention, there is further adopted a second control system by means of which the warning means 14 is operated and the driving motor 3' of the electric drill 3 is brought to a stop when the driving motor 3' is conspicuously overloaded. Further, as shown in FIG. 2, a feed motor 6 may be provided on the drilling machine for advancing the electric drill 3 toward the workpiece as occasion demands. In this case, the driving motor 3' and/or the feed motor 6 are simultaneously stopped when conspicuous overload is brought about. Returning to FIG. 3, the second control system is composed of a comparator 15 for comparing the load value m fed from the aforementioned detector 10 with a prescribed second reference voltage level Vz' and issuing an instruction signal when the load value becomes larger than the second reference level Vz' and a controller 16 which functions to switch off a switch $k_2$ provided on the electrical passage from the power source 8 to the driving motor 3' of the electric drill 3 and/or the feed motor 6 upon reception of the instruction signal from the comparator 15, thereby cutting off the supply of the electric current to the driving motor 3' and/or the feed motor 6. The second reference level Vz' in the comparator 15 of the second control system is higher than the first reference level Vz in the comparator 12 of the first control system, so that, when the overload exerted on the driving motor 3' is relatively small (<m), the warning means 14 alone is actuated through the medium of the first control system and, when the overload on the driving motor 3' goes to exess (<<m), the power switch $k_2$ is turned off to bring the driving motor 3' and/or the feed motor 6 to a stop through the medium of the second control system.

Figure 4:
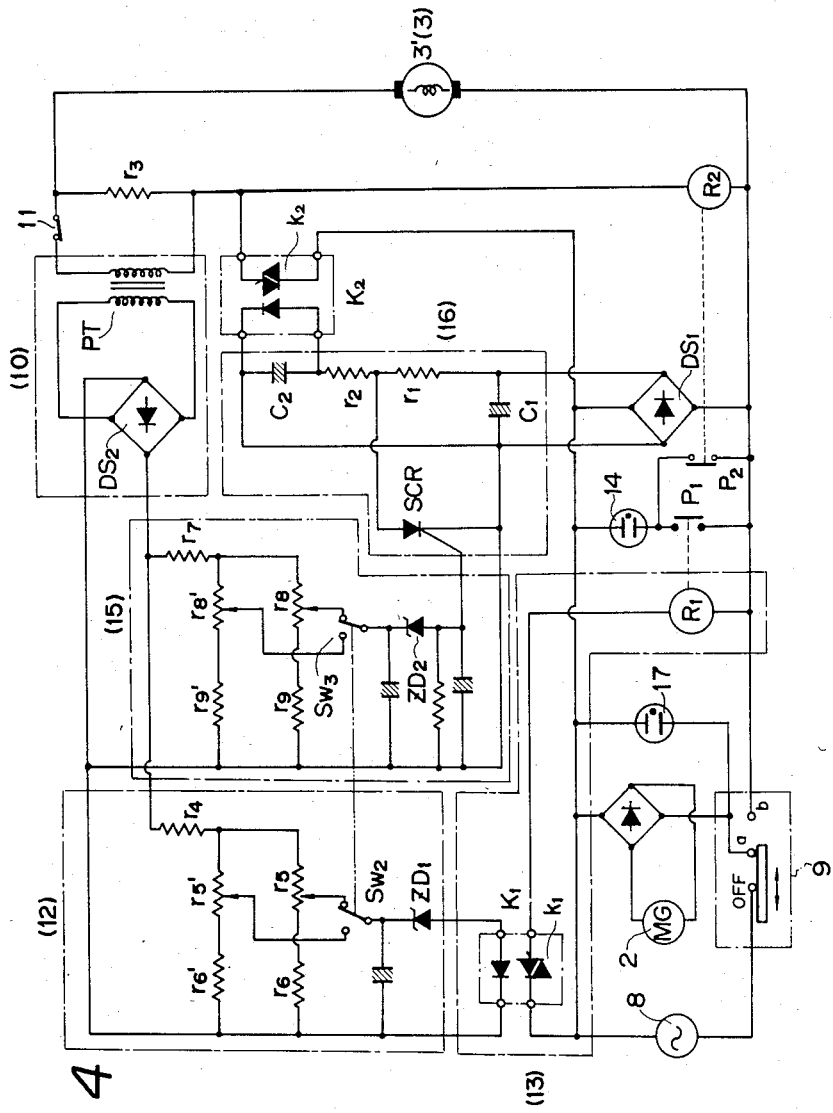
FIG. 4 is a schematic diagram of circuitry which may be employed by the control system of FIG. 3.

In FIG. 4, there is shown a schematic diagram of one preferred embodiment of the two control systems according to this invention, in which the feed operation for advancing the electric drill 3 toward the workpiece is manually carried out by means of the control handle 5 (FIGS. 1 and 3) without using the feed motor 6 (FIG. 2). In this diagram, the components denoted by the same symbols as those of FIG. 3 are equivalent thereto.

As shown in FIG. 4, the operational circuit for the electric drill 3 is composed of a full-wave rectifier $DS_1$ for subjecting an alternating current applied from the power source 8 to fullwave rectification, a smoothing circuit connected to the output side of the rectifier $DS_1$ and formed of condensers $C_1$ and $C_2$ and resistors $r_1$ and $r_2$, and a DC relay $K_2$ incorporating a switch $k_2$ which assumes the ON state upon reception of the bias voltage applied from the rectifier $DS_1$ through the smoothing circuit thereby permitting an electric current to be applied from the power source 8 to the driving motor 3'. Consequently, the driving motor 3' of the electric drill 3 is operational.

Circuitry shown in FIG. 4 is equivalent to the detector 10 illustrated in FIG. 3 and is formed of a transformer PT for amplification of the terminal voltage of a resistor $r_3$, and a full-wave rectifier $DS_2$ for subjecting an electric current outputted from the transformer PT to full-wave rectification. The voltage outputted from the rectifier $DS_2$ corresponds to the loam m exerted on the driving motor 3'.

As shown in FIG. 4, the first comparator 12 illustrated in FIG. 3 is formed of resistors $r_4$, $r_5$ and $r_6$ for dividing the voltage fed from the rectifier $DS_2$, and a constant-voltage diode $ZD_1$ which assumes the ON state when the voltage fed via the resistors $r_4$ to $r_6$ becomes larger than the Zener voltage thereof. As shown in FIG. 4, the controller 13 illustrated in FIG. 3 is formed of a DC relay $K_1$ which functions to have a switch $k_1$ thereof switched on upon reception of the signal fed through the diode $ZD_1$ and a relay $R_1$ which is actuated upon reception of the electric current given through the switch $k_1$. When the driving motor 3' of the electric drill 3 is in operation under the rated load, the load voltage fed from the detector 10 is lower than the Zener voltage of the diode $ZD_1$, consequently permitting the switch $k_1$ of the DC relay $K_1$ to assume the OFF state, with the result that the rlay $R_1$, having an "a" contact switch $P_1$, is turned off to have the contact switch $P_1$ opened. When the load voltage fed from the detector 10 becomes higher than the Zener voltage of the diode $ZD_1$, the switch $k_1$ of the relay $K_1$ is turned on to have the relay $R_1$ operated and consequently to close the contact switch $P_1$, thereby causing the warning device 14 to light up. The Zener voltage of the diode $ZD_1$ is constant, whereas the reference level at which the diode $ZD_1$ is switched on can undergo a change by adjusting the resistance value of the variable resistor $r_5$ (or $r_5'$). By operating a change-over switch $Sw_2$, the range of the reference level can readily be changed. The reference level is determined by means of a resistor $r_5$ or $r_5'$.

Returning to FIG. 3, when a relatively low overload is exerted on the driving motor 3', the aforementioned first comparator 12 and the controller 13 together are operated to cause the warning lamp 14 to light up. When the overload is further increased, the second comparator 15 and the controller 16 are operated to issue a warning and have the electric drill 3 stopped.

Returning to FIG. 4, the second comparator 15 is formed of resistors $r_7$, $r_8$ and $r_9$ for dividing the voltage fed from the rectifier $DS_2$, and a constant-voltage diode $ZD_2$ which is switched on when the voltage passing through these resistors becomes larger than the Zener voltage thereof. This is similar in construction and function to the aforementioned first comparator 12. The controller 16 has a silicon controlled rectifier SCR which assumes its ON state to cause the output current fed from the rectifier $DS_1$ to be short-circuited by virtue of the voltage supplied as a gate voltage through the constant-voltage diode $ZD_2$ at the time of the excessive overload on the electric drill 3. When the electric drill 3 is conspicuously overloaded, the supply of the electric current to the DC relay $K_2$ is cut off because of the silicon controlled rectifier SCR assuming its ON state, thereby turning off the switch $k_2$ of the DC relay $K_2$. As a result, the electric current is not applied to relay $R_2$ which is arranged in parallel with the driving motor 3' of the electric drill 3 to cause the relay $R_2$ to be out of operation. At this time, the "b" contact switch $P_2$ assumes the ON state to allow the electric current to be applied to the warning lamp 14. Consequently, the lamp 14 is lighted.

The resistors $r_8$ and $r_8'$ serve to change the range of the reference level at the diode $ZD_2$ which is turned on and the selection of the range of the reference level is carried out by operating a change-over switch $Sw_3$. The reference level can be finely changed by adjusting the variable resistor $r_8$ or $r_8'$.

According to the circuitry as described above, when the driving motor 3' of the electric drill 3 is overloaded, the warning lamp 14 is caused to light up, and when it is excessively overloaded, the driving motor 3' is stopped and simultaneously the warning lamp 14 is lighted. When the driving motor 3' resumes the normal state below the rated load after the driving motor 3' temporarily falls into an overload state, the diodes $ZD_1$ and $ZD_2$ together are switched off with the result that the lamp 14 is turned off and at the same time, the driving motor 3' again goes into operation. As shown in FIG. 4, a pilot lamp 17 is lighted when the electromagnetic base 2 is actuated by operating the power switch 9.

To perform non-control operation without use of the control system, the change-over switch 11 shown in FIGS. 3 and 4 may be turned off.

Figure 5:
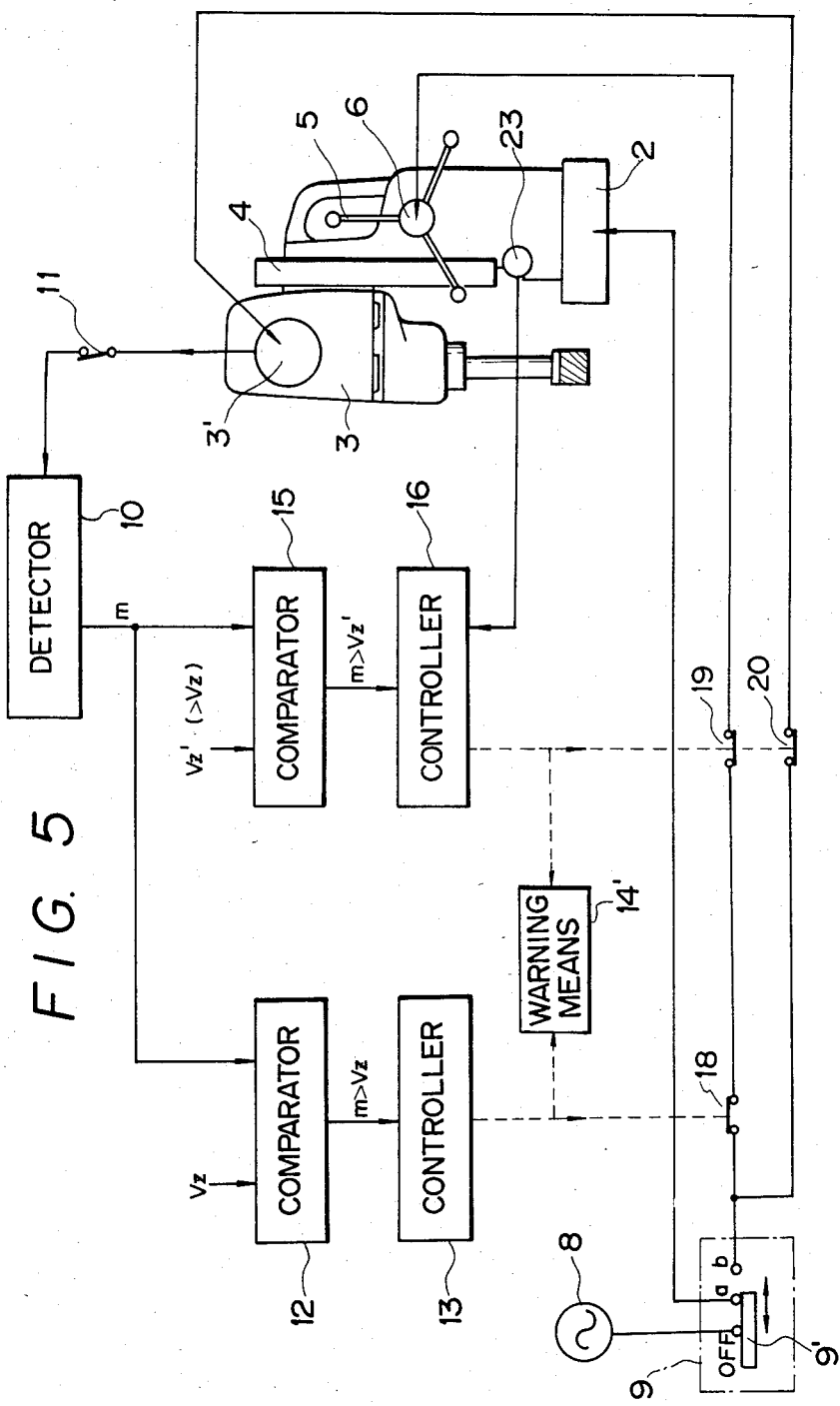
FIG. 5 is a schematic block diagram of another embodiment of the control system in the drilling machine according to this invention.
Figure 6:
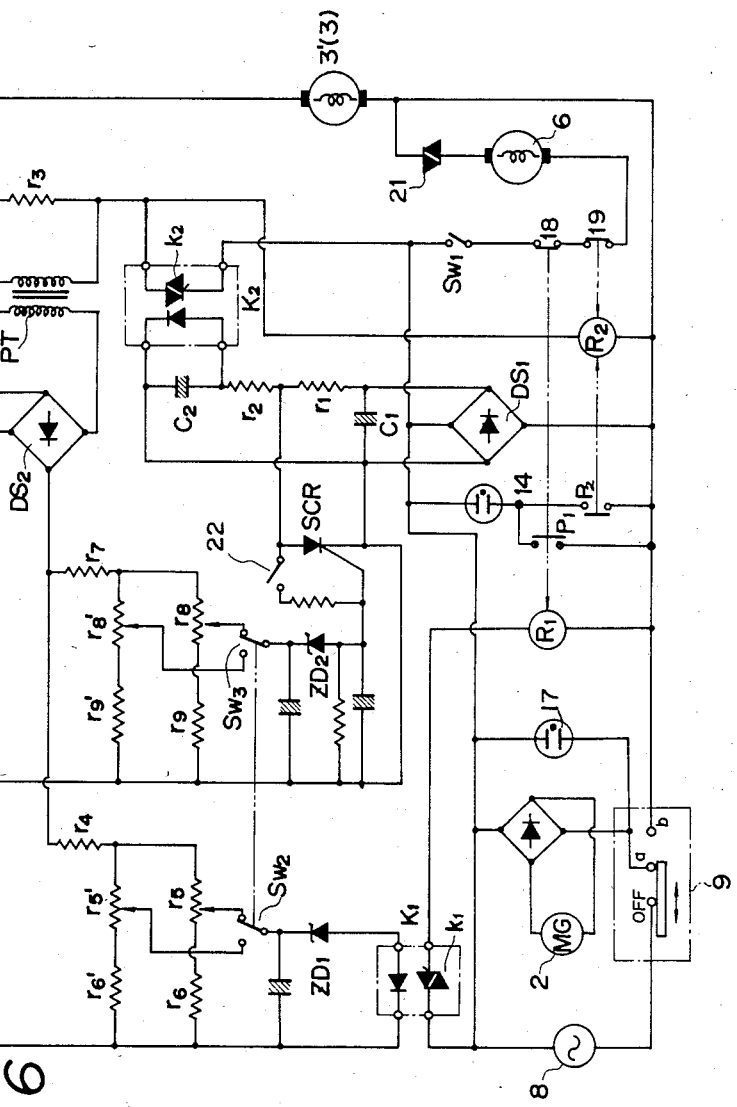
FIG. 6 is a schematic diagram of circuitry which may be employed by the control system of FIG. 5.

In FIGS. 5 and 6, there are illustrated a block diagram and a schematic diagram of circuitry applied to another embodiment on the basis of the drilling machine illustrated in FIGS. 1 and 2. This embodiment is fundamentally similar to the foregoing embodiment of FIGS. 3 and 4 and is characterized by having with an automatic feed function for automatically advancing the electric drill 3 toward the workpiece. For the materialization of this feed function, the drilling machine is provided in the machine proper with a feed motor 6 as illustrated in FIG. 2.

As schematically illustrated in FIG. 5, when the load m exerted on the electric drill 3 becomes larger than the first reference level $Vz$, a switch 18 interposed between the power source 8 and the feed motor 6 is opened by to the first controller 13, thereby to bringing the feed motor 6 to a stop. Further, when the load m exceeds the aforementioned second reference level $Vz'$, a switch 19 interposed between the power source 8 and the feed motor 6 and a switch 20 interposed between the power source 8 and the driving motor 3' both are turned off to cause both the driving motor 3' and the feed motor 6 to be stopped. The first and second controllers 13 and 16 each can function to actuate the warning means 14'.

With reference to FIG. 6 depicting a circuit diagram of the aforementioned control systems, the circuitry of this embodiment is identical with that of FIG. 4 except for the addition of the control and driving systems for the feed motor 6.

The feed motor 6 is connected to the power source 8 via an adjusting element 21 for adjustment of rotational speed of the feed motor 6, a switch $Sw_1$ for selection of automatic/manual feed operations, a "b" contact switch 18 which is actuated by a relay $R_1$ under the control of the first controller 13, and an "a" contact switch 19 which is actuated by a relay $R_2$ under the control of the second controller 16.

When the load exerted on the driving motor 3' of the electric drill 3 reaches the first reference level $Vz$ set in the first control system, the switch $k_1$ is turned on to actuate the relay $R_1$, and then, to open the contact switch 18 and close the contact switch $P_1$. Consequently, the supply of the electric current to the feed motor 6 is cut off to bring the motor 6 to a stop and at the same time, the contact switch $P_1$ is closed to allow the warning lamp 14 to light up.

When the load on the driving motor 3' reaches the second reference level of the second control system, the switch $k_2$ is turned off to cut the supply of the electric current to the driving motor 3' and simultaneously to permit the relay $R_2$ to assume the OFF state thereby opening the "a" contact switch 19. Consequently, the supply of the electric current to the feed motor 6 is cut off and simultaneously, the "b" contact switch $P_2$ is closed to allow the warning lamp 14 to light up. If the load becomes lower than the second reference level, the operations of the electric drill 3 and/or the feed motor 6 are resumed.

Thus, the feed motor 6 comes to a stop when the load on the electric drill 3 exceeds the first reference level, and the feed motor 6 and the driving motor 3' together come to a stop when the load exceeds the second reference level.

In this embodiment, there is further provided a limit switch 22 within the machine proper as illustrated in FIGS. 1 and 6. The limit switch 22 is connected in parallel to the rectifier SCR in the second control system as illustrated in FG. 6. When the boring work is finished, the limit switch 22 is actuated to be closed by a cam plate 23 (FIG. 1) which is lowered together with the electric drill 3. At the time the limit switch 22 is turned on, the switch k₂ assumes its OFF state thereby bringing the electric drill 3 and the feed motor 6 to a stop and lighting the lamp 14 in the same way as the rectifier SCR is turned on when the load on the electric drill 3 exceeds the second reference level. In this case, the lamp 14 serves as an indicating means which is turned on when the workpiece is completely pierced by the electric drill 3 and the boring work comes to an ends.

Figure 7:
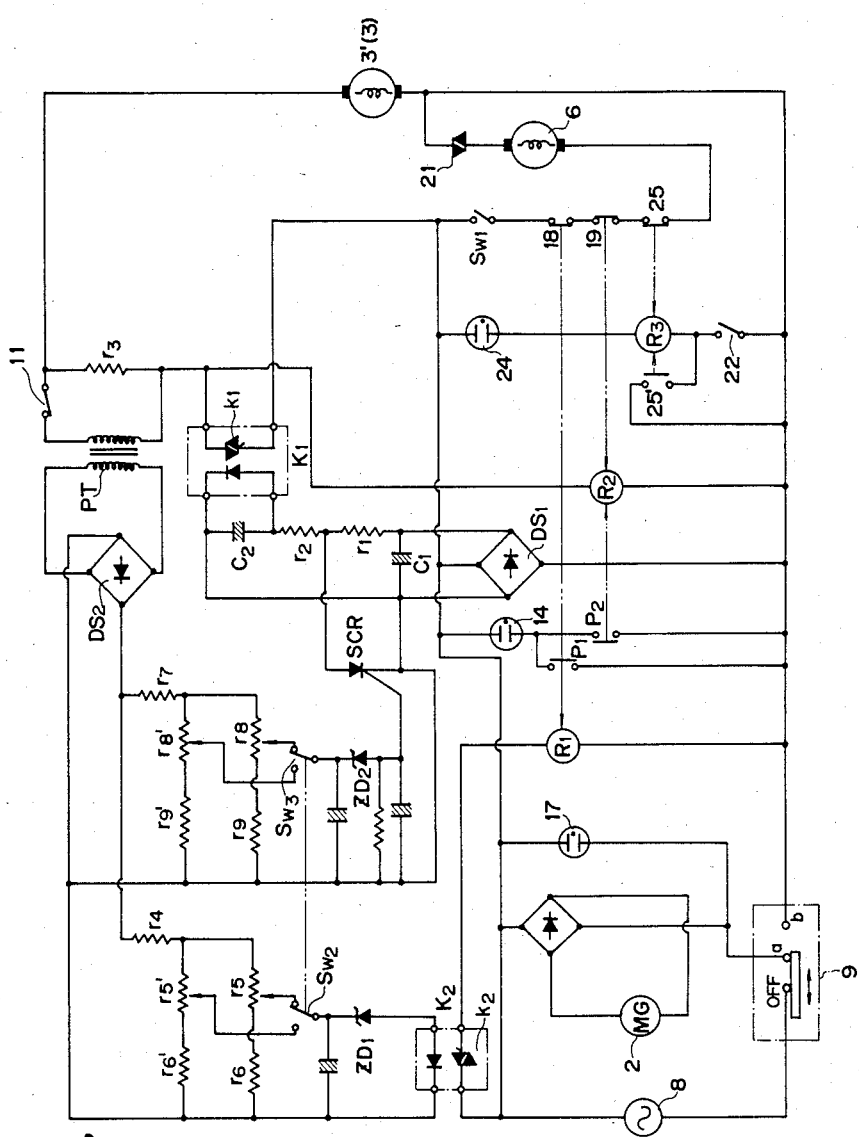
FIG. 7 is a schematic diagram illustrating still another embodiment of the drilling machine according to this invention.

FIG. 7 illustrates another embodiment wherein the aforementioned limit switch 22 and an indicating means for the finish of a boring work are used. In this embodiment, when the boring work is finished, the indicating means is worked instead of the warning lamp 14 in the foregoing embodiment and the driving motor 3' of the electric drill 3 comes to a stop. The circuitry of this embodiment further functions to maintain the stoppage of the electric drill 3 even if the electric drill 3 is elevated by rotating the control handle 5 (FIG. 1) to permit the limit switch 22 to resume its normal state after the boring work is done, thereby ensuring safety. This embodiment will be described with reference to FIG. 7.

The limit switch 22, an indicating lamp 24 serving as the aforementioned indicating means, and the relay switch R₃ are connected in series to one another and in parallel to the electric drill 3 and the feed motor 6. The "b" contact switch 25 of the relay switch R₃ is connected in series to the feed motor 6 and the "a" contact switch 25' of the relay switch R₃ is connected in parallel to the limit switch 22. In this construction, when the boring work if finished while at work, the electric drill 3 operates the limit switch 22 to assume the ON state through the medium of the cam plate 23 (FIG. 1) thereby allowing an electric current to be applied to the relay switch R₃ and the indicating lamp 24 consequently to cause the relay switch R₃ to be actuated and the indicating lamp to be lighted. By the relay switch R₃ being worked, the switch 25 is operated to cease the supply of an electric current to the feed motor 6 thereby putting a stop to the movement of the feed motor 6. At the same time, the relay switch R₃ thus actuated causes the switch 25' to be closed with the result that the relay switch R₃ is left operable until the power switch 9 is turned off. Namely, the feed motor 6 is kept at a stop until the power switch 9 is once turned off and then turned on again for newly starting boring operations.

Figure 8:
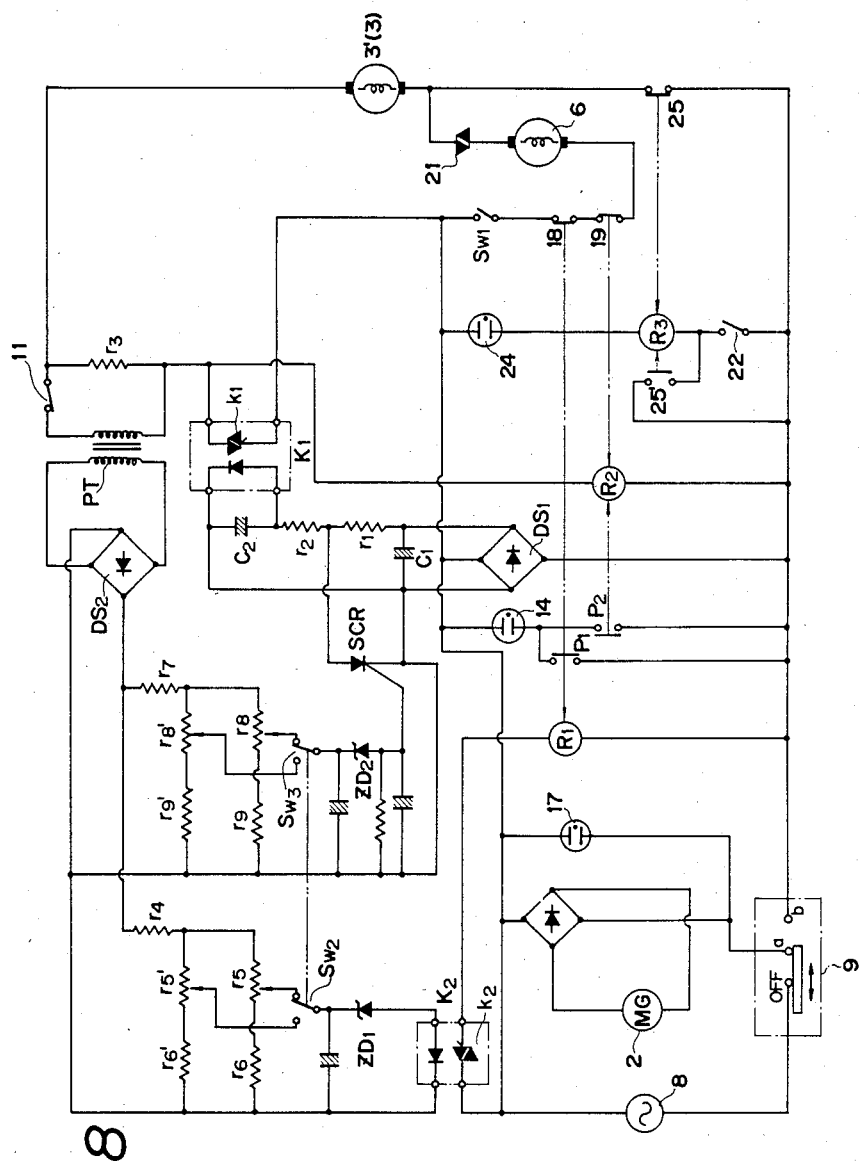
FIG. 8 is a schematic diagram illustrating yet another embodiment of the drilling machine according to this invention.

Referring to FIG. 8, there is shown still another embodiment in which the "b" contact switch 25 is connected in series to the feed motor 6 and the electric drill 3 and in parallel to the relay switch R₂. Likewise in this embodiment, when the limit switch 22 is closed, the relay switch R₃ is actuated thereby causing the switch 25 to be turned off and the switch 25' to be turned on. As a result, no electric current is applied to the feed motor 6 and the electric drill 3, thereby bringing the feed motor 6 and the electric drill 3 to a stop and allowing the indicating lamp 24 to be lighted. These working states thereof are maintained until the power switch 9 is once switched off.

Now, the application of the limit switch 22 and the indicating means 24, used as described above, to the control system of the drilling machine as illustrated in FIG. 4 will be described with reference to FIG. 9.

Figure 9:
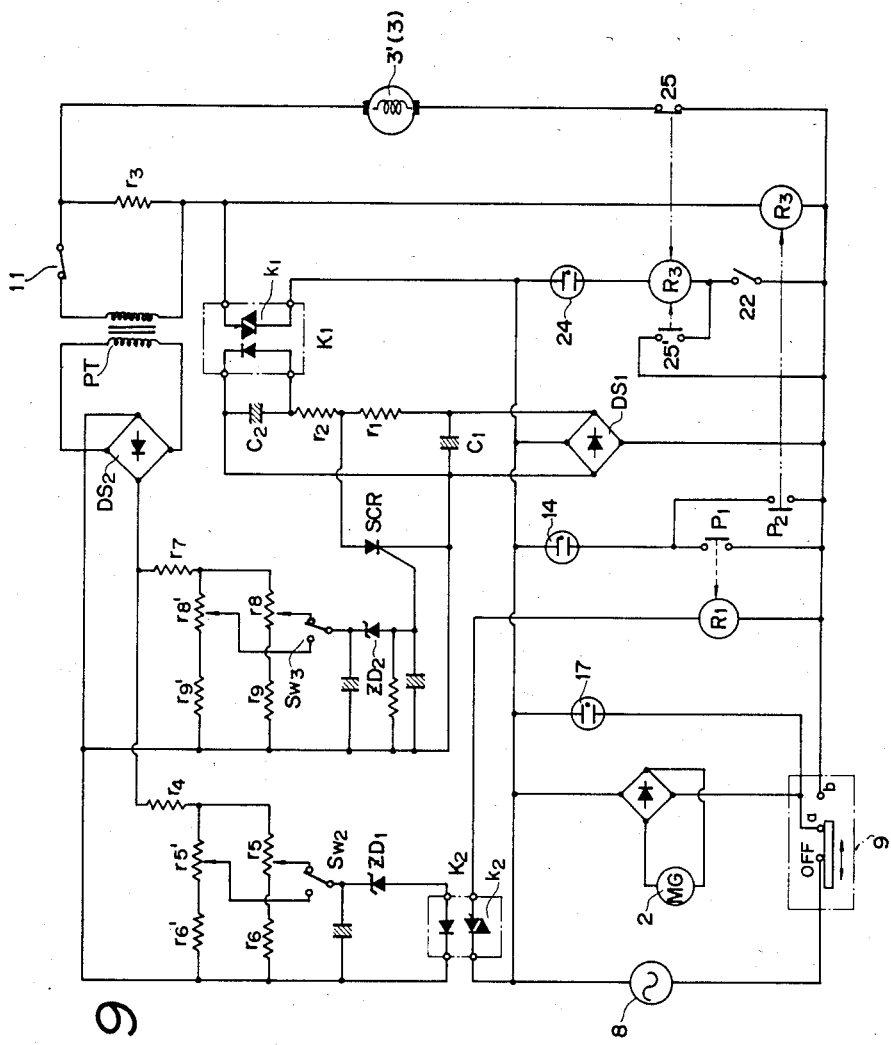
FIG. 9 is a schematic diagram illustrating a further embodiment of the drilling machine according to this invention.

The embodiment illustrated in FIG. 9 is designed to allow the drilling machine possessing no feed motor to have a function of indicating the completion of a boring work. Similarly to the foregoing embodiments, the relay switch R₃, the limit switch 22, and the indicating lamp 24 are connected in series to one another and in parallel to the electric drill 3. The "b" contact switch 25 of the relay switch R₃ is connected in series to the electric drill 3 and the "a" contact switch 25' thereof is connected in parallel to the limit switch 22. When the limit switch 22 is closed at the time of the boring work, the indicating lamp 24 is lighted and the relay switch R₃ is actuated thereby permitting the switch 25 to be opened and the switch 25' to be closed. Consequently, the electric drill 3 makes a stop and is continuously at a stop until the power switch 9 is turned off and then turned back on.

As will be clearly understood from the foregoing description of this invention, the drilling machine according to this invention enjoys an advantage that, when a load on the electric drill exceeds a first reference load level of a relatively low amount, the warning means can be actuated to issue a warning or the feed motor can be automatically stopped, and further, when a load in excess of a second reference load level higher than the first reference level is brought about, the driving motor of the electric drill along with the feed motor can be stopped, whereby an accident such as breakage of the drilling tool or seizure of the electric drill can be prevented. Besides, since the electric drill and the feed motor are again actuated when the overload on the electric drill is reduced, a full automatic drilling machine can be realized to offer increased workability and assure high safety.

What is claimed is:

1. In a drilling machine having a frame, an electromagnetic base integrally mounted at the lower portion of said frame and being capable of electromagnetic fixation on a workpiece, an electric drill integrally mounted on said frame and provided with an annular cutter which is rotated by a driving motor, a power circuit for applying an electric current to the driving motor of the electric drill and the electromagnetic base, and a power switch means for actuating the power circuit, the improvement which comprises:

a detector means, connected to the driving motor, for detecting a load value from said electric drill;

a first control system connected to the detector means and composed of a first means for comparing the load value fed from said detector means with a prescribed first variable reference level and a first controlled means for issuing an instruction when the load value becomes larger than the first variable reference level;

a second control system connected to the detector means and composed of a second means for comparing the load value fed from said detector means with a prescribed second variable reference level higher than said first variable reference level and a second controller means for issuing an instruction when the load value becomes larger than the second variable reference level;

a single warning device connected between the first controller means and the second controller means, said warning device being actuated upon reception of the instruction issued from one of the first controller means of the first control system and the second controller means of the second control system;

a first switch means, interposed between the power circuit and the electric drill, for cutting off the supply of the electric current to the electric drill upon reception of the instruction issued from the second controller means of the second control system;

an automatic feed motor arranged in the frame and adapted to vertically advance the electric drill toward the workpiece;

a second switch means, interposed between the power circuit and the feed motor, for cutting off the supply of the electric current to the feed motor upon reception of the instruction issued from the first controller means of the first control system;

a change-over switch, separated from the power switch means and interposed between the electric drill and the detector means, whereby manual operation can be carried out when the change-over switch is opened;

a manually operated control handle means, attached to the frame, for vertically advancing the electric drill toward the workpiece;

a limit switch provided within the frame and connected in parallel to the second control system, said limit switch being actuated to be opened to cut off the supply of the electric current to the electric drill and the feed motor when a boring work comes to an end; and signal means, connected in series to the limit switch and operated by an electric current fed through the limit switch, for indicating the boring work has come to the end.

* * * * *